US012277184B2

(12) United States Patent
Sunkle et al.

(10) Patent No.: US 12,277,184 B2
(45) Date of Patent: Apr. 15, 2025

(54) AUTOMATED CONSTRUCTION OF INGREDIENT-FUNCTIONALITY LISTS FOR FORMULATED PRODUCTS USING SEARCH ENGINE RESULT EXCERPTS (71) Applicant: Tata Consultancy Services Limited, Mumbai (IN)

(72) Inventors: Sagar Sunkle, Pune (IN); Vinay Kulkarni, Pune (IN); Deepak Shyamsunder Jain, Pune (IN); Beena Rai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/529,654

(22) Filed: Dec. 5, 2023

(65) Prior Publication Data

US 2024/0193216 A1 Jun. 13, 2024

(30) Foreign Application Priority Data

Dec. 12, 2022 (IN) .............................. 202221071717

(51) Int. Cl.
*G06F 16/9538* (2019.01)
*G06F 16/9532* (2019.01)
(52) U.S. Cl.
CPC ...... *G06F 16/9538* (2019.01); *G06F 16/9532* (2019.01)
(58) Field of Classification Search
None
See application file for complete search history.

(56) References Cited

U.S. PATENT DOCUMENTS 9,971,737 B2    5/2018  Pinel et al.
10,417,688 B2 * 9/2019  Caster ................. G06F 16/9535
(Continued)

OTHER PUBLICATIONS

Sunkle Sagar et al: "Information Extraction and Graph Representation for the Design of Formulated Products", Jun. 3, 2020, Springer, (Year: 2020).*

(Continued)

*Primary Examiner* — Amresh Singh
(74) *Attorney, Agent, or Firm* — FINNEGAN, HENDERSON, FARABOW, GARRETT & DUNNER LLP (57) ABSTRACT This disclosure relates generally to the field of retrieval and extraction for designing formulated products by constructed ingredient-functionality lists for formulated products using search engine result excerpts in an automated manner. Many ingredients used in formulated products are multi-functional. Conventionally, in a given category of formulated product, only a single functionality or subset of functionalities of an ingredient is used ignoring other functionalities of which the ingredient is representative. However, there is a need to put together representative ingredients before proceeding further with process steps of making and testing the formulated product. The present disclosure addresses unresolved problems of the conventional methods by obtaining information regarding the functionalities of ingredients used in formulated products using search engines based on a loop processing involving query formation, and construction of a list of ingredients and functionalities till exhaustion.

9 Claims, 6 Drawing Sheets (56) References Cited

U.S. PATENT DOCUMENTS

2011/0295888 A1* 12/2011 Hogue ................. G06F 16/951
707/769
2023/0316373 A1* 10/2023 Xu ..................... G06Q 30/0641
705/26.7

OTHER PUBLICATIONS

Chaudhari, Shilpa et al., "Ingredient/Recipe Algorithm using Web Mining and Web Scraping for Smart Chef", Title of the item: 2020 IEEE International Conference on Electronics, Computing and Communication Technologies (CONECCT), Date: 2020, Publisher: IEEE, Link: https:/sci-hub.se/10.1108/CONECCT50063.2020.9198450.

Sharo, Serge, "Creating general-purpose corpora using automated search engine queries", Date: 2006.

Afsarmanesh, Hamideh et al., "On service-enhanced product recommendation guiding users through complex product specification", Title of the item: International Conference on Computing and Communications Technologies, Date: 2015, Publisher: IEEE.

* cited by examiner

AUTOMATED CONSTRUCTION OF INGREDIENT-FUNCTIONALITY LISTS FOR FORMULATED PRODUCTS USING SEARCH ENGINE RESULT EXCERPTS

PRIORITY CLAIM

This U.S. patent application claims priority under 35 U.S.C. § 119 to: India Application No. 202221071717, filed on Dec. 12, 2022. The entire contents of the aforementioned application are incorporated herein by reference.

TECHNICAL FIELD

The disclosure herein generally relates to the field of information retrieval and extraction, and, more particularly, to automated construction of ingredient-functionality lists for formulated products using search engine result excerpts.

BACKGROUND

Formulated product industry has been gaining momentum in recent time. Generally, formulated products contain ingredients that undergo step-by-step processes including heating, cooling, stirring, and mixing to obtain specific physical and chemical target properties. Many ingredients used in formulated products are multi-functional. In a given category of formulated product, experts may often use only a single functionality or subset of functionalities of an ingredient ignoring other functionalities of which the ingredient is representative. When designing a formulated product with target properties, an expert starts with consumer requirements, translating them to physical and chemical properties, and, depending on the formulated product type, chooses a set of functionalities. However, experts must put together representative ingredients before proceeding further with process steps of making and testing the product.

In formulation design, it is necessary to store the functionalities of ingredients. This information is scarcely available in offline media like books and patents. Conventionally, this information may be amply available online but happens to be spread across different specialty sites. Several online sites contain varied information about ingredients used in formulated products. Even though most of such conventional sources contain extensive information on ingredients, including many physical and chemical properties, only a few have been explored to present ingredients' functionalities. Additionally, if different sites are crawled for functionalities of ingredients, then it becomes necessary to take care of various formats in which such information may appear. Finally, the state of the art approach has been primarily passive, meaning that it has focused on examining how search engines generate the result excerpts, the quality of excerpts, the variety of excerpts, and so on, without actively using the result excerpts for search, retrieval, and extraction of information of interest.

SUMMARY

Embodiments of the present disclosure present technological improvements as solutions to one or more of the above-mentioned technical problems recognized by the inventors in conventional systems. For example, in one embodiment, a processor implemented method is provided. The processor implemented method, comprising receiving, via one or more hardware processors, one or more input ingredients and a specific formulated product type from a user; formulating, via the one or more hardware processors, a first set of queries for the one or more input ingredients in context of the specific formulated product type; obtaining, via the one or more hardware processors, a list of functionalities for one or more input ingredients in context of the specific formulated product type, wherein the list of functionalities is obtained by processing a plurality of results retrieved from one or more data sources based on the first set of queries; formulating, via the one or more hardware processors, a second set of queries for the list of functionalities obtained for the one or more input ingredients in context of the specific formulated product type; and iteratively performing, via the one or more hardware processors, until an exhaustive list of incoming ingredients and functionalities is constructed: constructing, a list of incoming ingredients that are representative of each functionality from the list of functionalities obtained for the one or more input ingredients in context of the specific formulated product, wherein the list of incoming ingredients is obtained by processing the plurality of results retrieved from the one or more data sources based on the second set of queries; and obtaining, a list of functionalities for each incoming ingredient from the list of incoming ingredients in the context of the specific formulated product type, wherein the list of functionalities is obtained by processing the plurality of results retrieved from the one or more data sources based on a third set of queries.

In another aspect, a system is provided. The system comprising a memory storing instructions; one or more communication interfaces; and one or more hardware processors coupled to the memory via the one or more communication interfaces, wherein the one or more hardware processors are configured by the instructions to: receive, one or more input ingredients and a specific formulated product type from a user; formulate, a first set of queries for the one or more input ingredients in context of the specific formulated product type; obtain, a list of functionalities for one or more input ingredients in context of the specific formulated product type, wherein the list of functionalities is obtained by processing a plurality of results retrieved from one or more data sources based on the first set of queries; formulate, a second set of queries for the list of functionalities obtained for the one or more input ingredients in context of the specific formulated product type; and iteratively perform, until an exhaustive list of incoming ingredients and functionalities is constructed: construct, a list of incoming ingredients that are representative of each functionality from the list of functionalities obtained for the one or more input ingredients in the context of the specific formulated product, wherein the list of incoming ingredients is obtained by processing the plurality of results retrieved from the one or more data sources based on the second set of queries; and obtain, a list of functionalities for each incoming ingredient from the list of incoming ingredients in context of the specific formulated product type, wherein the list of functionalities is obtained by processing the plurality of results retrieved from the one or more data sources based on a third set of queries.

In yet another aspect, a non-transitory computer readable medium is provided. The non-transitory computer readable medium are configured by instructions for receiving, one or more input ingredients and a specific formulated product type from a user; formulating, a first set of queries for the one or more input ingredients in context of the specific formulated product type; obtaining, a list of functionalities for one or more input ingredients in context of the specific formulated product type, wherein the list of functionalities is obtained by processing a plurality of results retrieved from one or more data sources based on the first set of queries; formulating, a second set of queries for the list of functionalities obtained for the one or more input ingredients in context of the specific formulated product type; and iteratively performing, until an exhaustive list of incoming ingredients and functionalities is constructed: constructing, a list of incoming ingredients that are representative of each functionality from the list of functionalities obtained for the one or more input ingredients in context of the specific formulated product, wherein the list of incoming ingredients is obtained by processing the plurality of results retrieved from the one or more data sources based on the second set of queries; and obtaining, a list of functionalities for each incoming ingredient from the list of incoming ingredients in the context of the specific formulated product type, wherein the list of functionalities is obtained by processing the plurality of results retrieved from the one or more data sources based on a third set of queries.

In accordance with an embodiment of the present disclosure, the one or more data sources include a plurality of search engines.

In accordance with an embodiment of the present disclosure, the plurality of results retrieved from the one or more data sources include search excerpts and featured snippets.

In accordance with an embodiment of the present disclosure, the plurality of results retrieved from the one or more data sources are processed using one or more natural language processing techniques.

In accordance with an embodiment of the present disclosure, the exhaustive list of incoming ingredients and functionalities indicates that no new incoming ingredient and functionality are identified.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Formulated product industry has been gaining momentum in recent time. Generally, formulated products contain ingredients that undergo step-by-step processes including heating, cooling, stirring, and mixing to obtain specific physical and chemical target properties. Many ingredients used in formulated products are multi-functional. For example, Cetyl Alcohol may be used as an emulsifier and a thickening agent in cosmetic products while treated as a flavoring agent when used as a food additive. In a given category of formulated product, experts may often use only a single functionality or subset of functionalities of an ingredient ignoring other functionalities of which the ingredient is representative. When designing a formulated product with target properties, an expert starts with consumer requirements, translating them to physical and chemical properties, and, depending on the formulated product type, chooses a set of functionalities. However, experts must put together representative ingredients before proceeding further with process steps of making and testing the product.

In formulation design, it is necessary to store the functionalities of ingredients. This information is scarcely available in offline media like books and patents. Conventionally, this information may be amply available online but happens to be spread across different specialty sites. Several online sites contain varied information about ingredients used in formulated products. Examples of such sites include Wikipedia®, PubChem®, Chebi, ChemSpider®, and SpecialChem®, and/or the like. Even though, most of such conventional sources contain extensive information on ingredients, including many physical and chemical properties, but only a few have been explored to present ingredients' functionalities. Additionally, if different sites are crawled for functionalities of ingredients, then it becomes necessary to take care of various formats in which such information may appear. Finally, none of the known sites may contain the required information.

The present disclosure addresses unresolved problems of the conventional methods by obtaining information regarding the functionalities of ingredients used in formulated products from online information sources in a streamlined and automated manner using search engines such as Google and recent advancements like featured snippets. Since most search engines do not restrict themselves to specific websites compared to obtaining information from specialty sites, using search results provides a larger canvas of websites, articles, blogs, and other forms of information. Further, it is not necessary to have prior knowledge as in case of scraping specific sites. Further, in contrast to the websites, many search engines provide some forms of 'featured snippets' which are highlighted excerpts of text that appear at top of a search results page. A known in the art search engine (i.e., Google) presents these snippets to user based on web search listings, ranking of web pages, and continuous user feedback. A search engine's results in the form of excerpts or paragraphs, or other forms, primarily featured snippets such as in Google and similarly presented information on other search engine's results page, alleviate problems encountered in obtaining information from websites. For example, it is possible to search by "what are the uses of X?" to obtain the functionalities of an ingredient X. As an example, Google provides a featured snippet, in some cases highlighting part of the snippet as bold text, that answers the above query with a list of functionalities. It also provides a link to the web page from where it obtained the text spans of the snippet or a web page that contains relevant information.

In the present disclosure, it is not required to create site-specific scrappers. Featured snippet results can be processed when they are available, and required information can also be obtained from those sources such as articles, blogs, and online and open PDFs also that were not previously considered. This makes search canvas much more comprehensive than a few specialty websites. Conventionally, it is impossible to contextualize the information obtained from online sources at the time of scraping. For instance, if it is required to extract the functionality of an ingredient in a specific subdomain of the formulated products, it would necessitate collecting multiple sources of information and then attempting to answer a query such as what are the uses of Cetyl Alcohol in cosmetics as opposed to foods, or what are the uses of Titanium Dioxide in cosmetics as opposed to paints and coatings. Thus, a good resource document must be available for extracting information of interest. Conventionally even if such a document is available, problems of restricted search canvas, specific formatting (irrespective of whether contents of the document were structured or unstructured), and lack of contextualization continue to persist. While search engines enable information that is a) well formatted (in cases of featured snippet like information), b) obtained from a highly ranked resource (which can be a specialty site, blog, articles, an online PDF or similar form), and c) composed with emphasis on the text that is likely the answer to a search query, manual intervention is involved for obtaining specific pieces of information. For example, if a user knows what to look for, then it is possible to continue to use the search engine. It is also possible to automate the process. On the other hand, if it is not known what to look for, the user needs to read through the results and then posit the subsequent search query. A manual search can be cumbersome for creating a list of ingredients and their functionalities. In the case of ingredients used in formulated products, if the user does not know a priori the ingredients used in specific types of formulated products, then the user must establish a list of ingredients first. Such a list is likely to be non-exhaustive. It might be possible to query the functionalities of these ingredients in an automated manner, but the overall process remains largely manual. In this case, automating the search query formation and processing of the results for a specific purpose, such as building lists of ingredients used in formulated products and their functionalities, requires a principled approach.

In other words, conventionally, useful information extraction from online sources presents the following challenges:

a. It is necessary to know from which sites to obtain specific information, such as the functionalities of ingredients used in formulated products, reducing the overall canvas of information. Further, it is necessary to tweak the extraction of relevant information based on formatting and indirection (i.e., clicking on multiple links is required to reach a desired information) present in the structure of a specific site.
 b. Information extraction contextualization is difficult when using specialty sites. In contrast, search engines that provide results summaries like featured snippets enable contextualization by producing relevant results based on the correctly contextualized search query.
 c. While search engines may provide result excerpts for specific queries, process involving forming an appropriate query and processing the excerpts to extract information of interest needs to be automated in a principled manner rather than conducting this process manually.

Embodiments of the present disclosure provide systems and methods for automated construction of ingredient-functionality lists for formulated products using search engine result excerpts. More Specifically, the present disclosure describes the following:

1. Automated retrieval and extraction of information of interest from search result excerpts provided by search engines.
 2. A method that is applicable to any search engine that produces result excerpts for any formulated products subdomain to build lists of ingredients and their functionalities.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

Figure 1:
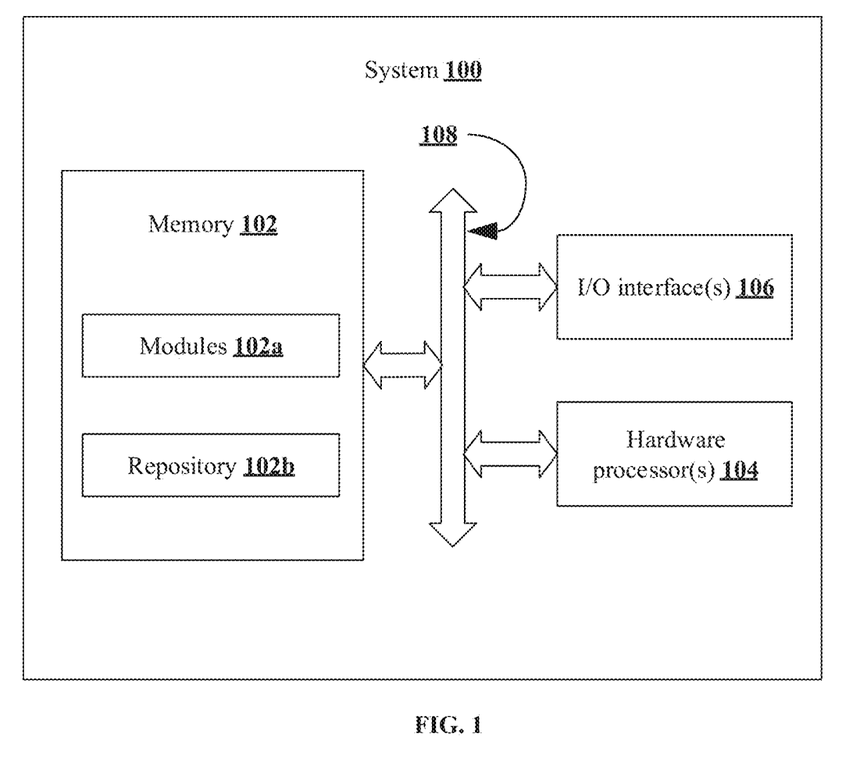
FIG. 1 is a functional block diagram of the system for automated construction of ingredient-functionality lists for formulated products using search engine result excerpts according to some embodiments of the present disclosure.

FIG. 1 is a functional block diagram of the system 100 for automated construction of ingredient-functionality lists for formulated products using search engine result excerpts according to some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102b is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
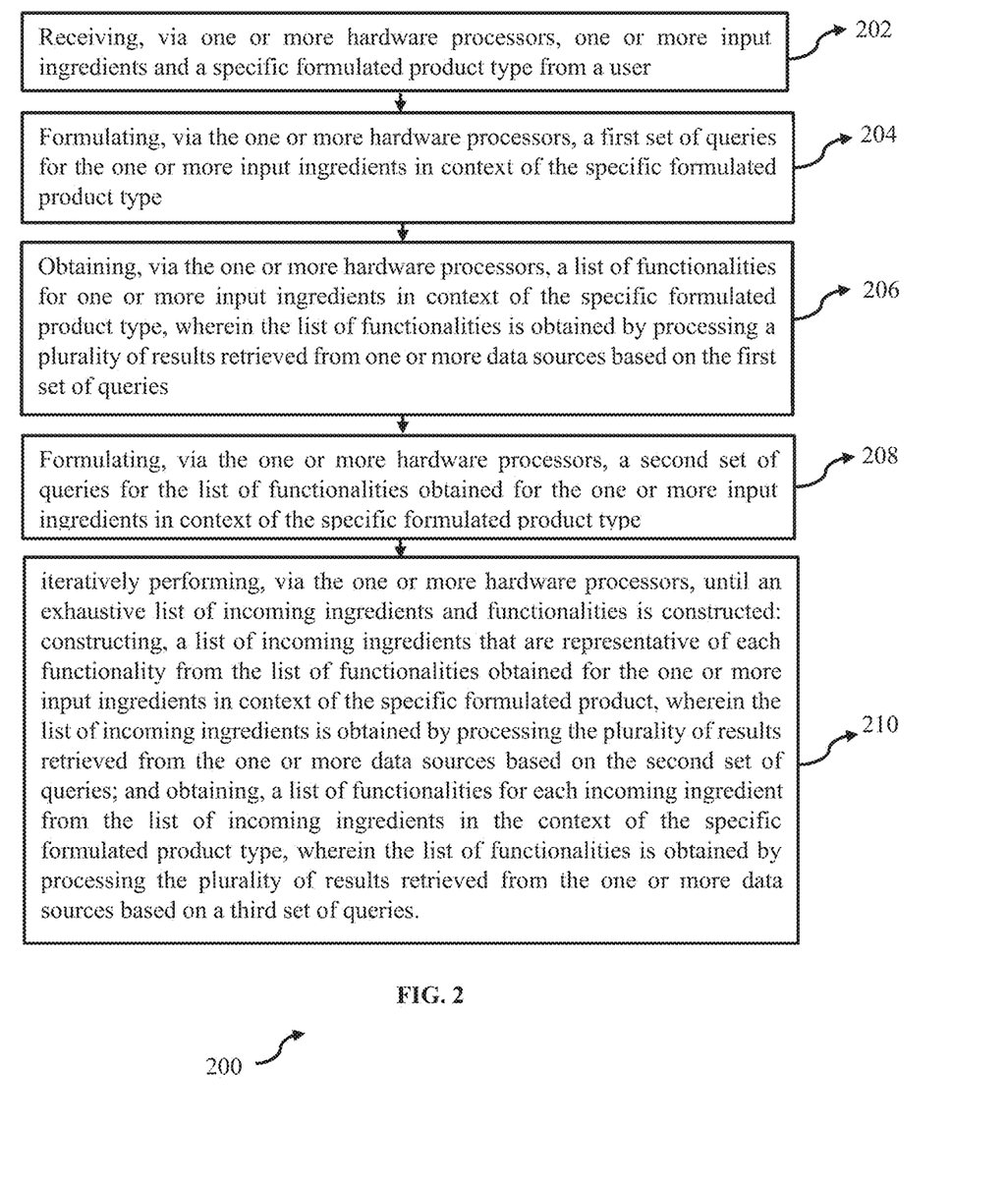
FIG. 2 illustrates an exemplary flow diagram illustrating a method for automated construction of ingredient-functionality lists for formulated products using search engine result excerpts, using the system of FIG. 1, in accordance with some embodiments of the present disclosure.

FIG. 2, with reference to FIG. 1, illustrates an exemplary flow diagram illustrating a method for automated construction of ingredient-functionality lists for formulated products using search engine result excerpts, using the system 100 of FIG. 1 in accordance with some embodiments of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the flow diagram as depicted in FIG. 2, the block diagram of FIG. 3, and one or more examples. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

Figure 3:
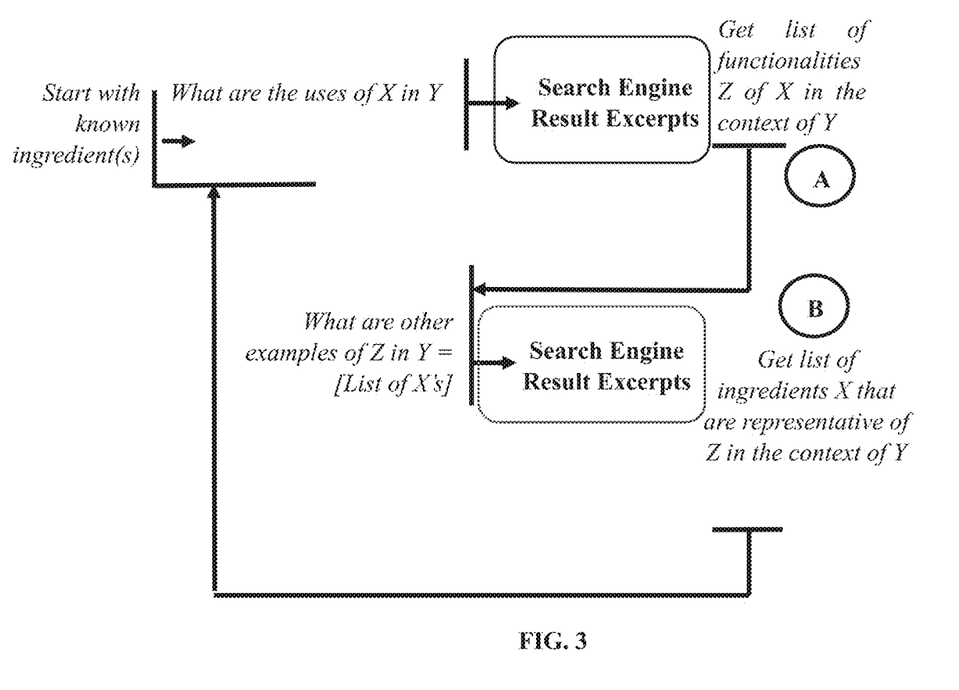
FIG. 3 illustrates a block diagram illustrating a search engine excerpts loop for automated construction of ingredient-functionality lists for formulated products using search engine result excerpts, using the system of FIG. 1, according to some embodiments of the present disclosure.

In an embodiment, at step 202 of the present disclosure, the one or more hardware processors 104 are configured to receive one or more input ingredients and a specific formulated product type from a user. FIG. 3 illustrates a block diagram illustrating a search engine excerpts loop for automated construction of ingredient-functionality lists for formulated products using search engine result excerpts according to some embodiments of the present disclosure. As shown in FIG. 3, it is shown that known ingredients denoted by X are used as the one or more input ingredients and the specified formulated product type is denoted by Y.

Further, at step 204 of the present disclosure, the one or more hardware processors 104 are configured to formulate a first set of queries for the one or more input ingredients in context of the specific formulated product type. For example, as shown in FIG. 3, a non-limiting example of a formulated query from the first set of queries is 'What are the uses of X in Y'.

Figure 4A:
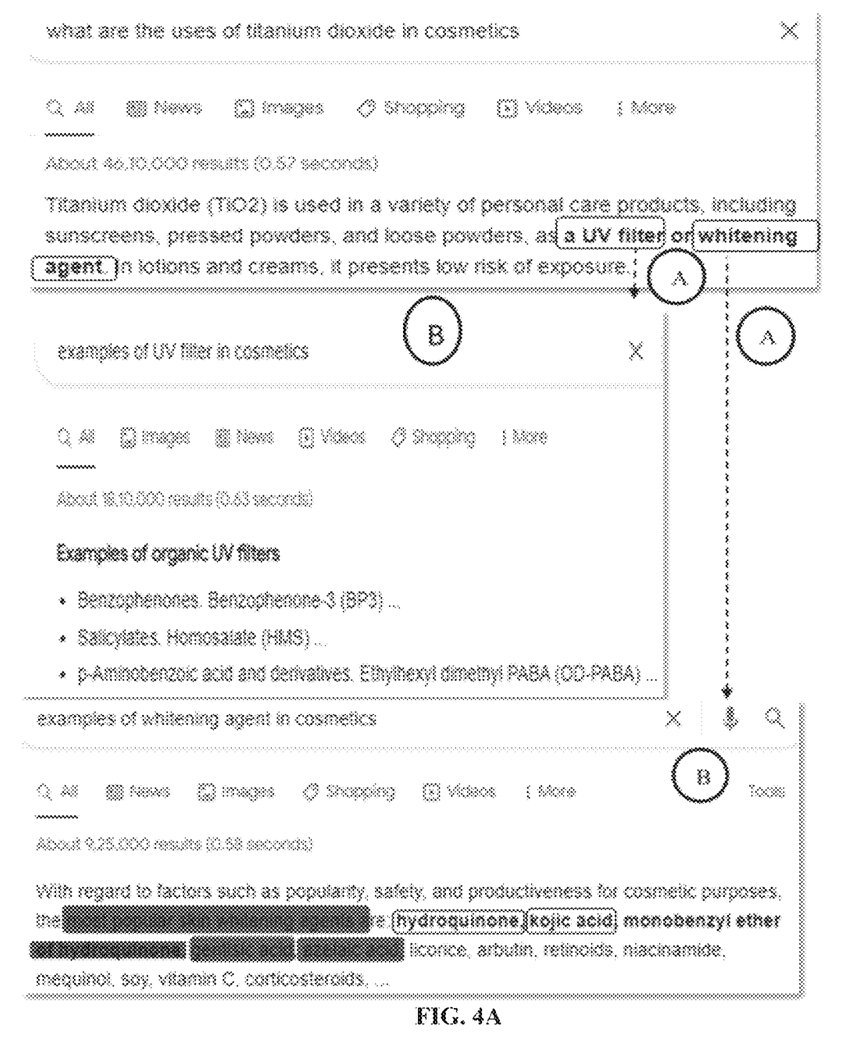
FIGS. 4A and 4B illustrate examples of executing the search engine excerpts loop for automated construction of ingredient-functionality lists for formulated products using search engine result excerpts, using the system of FIG. 1, according to some embodiments of the present disclosure.
Figure 4B:
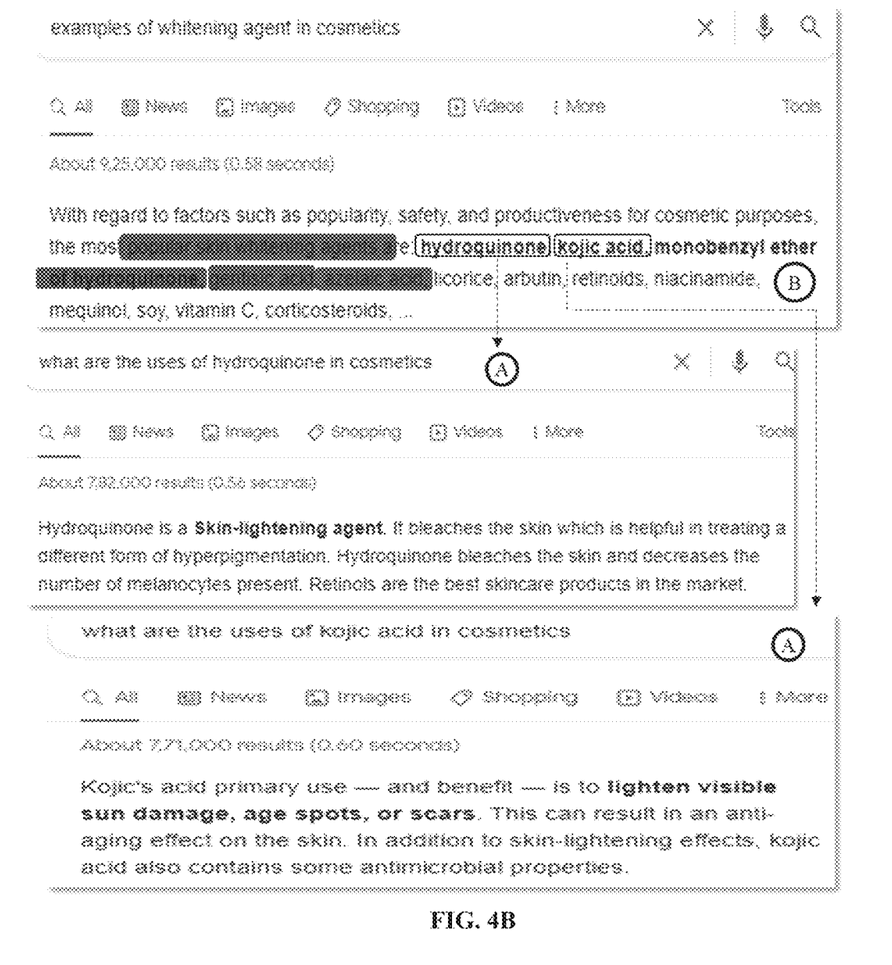

At step 206 of the present disclosure, the one or more hardware processors 104 are configured to obtain a list of functionalities for one or more input ingredients in context of the specific formulated product type. In an embodiment, the list of functionalities is obtained by processing a plurality of results retrieved from one or more data sources based on the first set of queries. The one or more data sources include a plurality of search engines. The plurality of search engines may include but not limited to any of known in the art search engines such as Google™, Bing™, and/or the like. In an embodiment, the plurality of results retrieved from the one or more data sources include search excerpts and featured snippets. The plurality of results retrieved from the one or more data sources are processed using one or more natural language processing techniques. In other words, the plurality of search engines are programmatically queried and the plurality of result such as search excerpts and featured snippets are processed when present, using any of the one or more natural language processing techniques. In an embodiment, the one or more natural language techniques may include but not limited to text processing by searching words/phrases using regex for specific suffix endings, using html tags, entity recognition, basic pattern matching, and/or the like. For example, functionalities are extracted using basic text processing techniques including searching words/phrases using regex for specific suffix endings (e.g., ent→'Absorbent', 'Astringent', 'Emollient', 'Pearlescent', 'Solvent', er→'Emulsifier', 'Plasticiser', 'UvAbsorber', 'UVFilter', ant→'denaturant', ic→'Antiseborrheic', 'Antistatic', 'Keratolytic', 'Tonic') and using patterns (e.g., 'help(s) to_', 'help_', 'used as'). Additionally, it is observed that text of functionalities within the search excerpt is bold and can be extracted using html tags. However, incoming ingredients are extracted using specialized named entity recognition open-source tools such as 'chemDataExtractor' that is capable of identifying ingredients from a given text. In addition to named entity recognition, basic pattern matching can also be used to identify incoming ingredients. FIGS. 4A and 4B illustrate exemplary examples of executing the search engine excerpts loop for automated construction of ingredient-functionality lists for formulated products using search engine result excerpts according to some embodiments of the present disclosure. As shown in FIG. 3, point A shows when a list of functionalities is obtained for a given ingredient. In this case, point A indicates that the list of functionalities of the known ingredients X is obtained in context of the formulated product type Y. Here, the list of functionalities is denoted by Z. For example, as shown in FIG. 4A, if the formulated query is 'What are the uses of titanium dioxide in cosmetics', the search excerpts obtained as result by the search engine is 'Titanium dioxide (TiO2) is used in a variety of personal care products, including sunscreens, pressed powders, and loose powders, as a UV filter or whitening agents in lotions and creams. It presents low risk of exposure'. As can be seen in the text obtained from the search engine, the text 'UV filter' and 'whitening agents' are referred to as functionalities of the known ingredient Titanium dioxide (TiO2) in context of the formulated product type cosmetics.

In an embodiment, at step 208 of the present disclosure, the one or more hardware processors 104 are configured to formulate a second set of queries for the list of functionalities obtained for the one or more input ingredients in context of the specific formulated product type. For example, as shown in FIG. 3, a non-limiting example of a formulated query from the second set of queries is 'What are the examples of Z in Y'. For example, as shown in FIG. 4A, when the functionalities identified are 'UV filter' and 'whitening agents', the second set of queries could be 'examples of UV filters in cosmetics' and 'examples of whitening agent in cosmetics'.

At step 210 of the present disclosure, the one or more hardware processors 104 are configured to iteratively perform, until an exhaustive list of incoming ingredients and functionalities is constructed, the steps of: constructing, a list of incoming ingredients that are representative of each functionality from the list of functionalities obtained for the one or more input ingredients in the context of the specific formulated product, wherein the list of incoming ingredients is obtained by processing the plurality of results retrieved from the one or more data sources based on the second set of queries; and obtaining, a list of functionalities for each incoming ingredient from the list of incoming ingredients in context of the specific formulated product type, wherein the list of functionalities is obtained by processing the plurality of results retrieved from the one or more data sources based on a third set of queries. The list of incoming ingredients is obtained by processing the plurality of results retrieved from the one or more data sources based on the second set of queries. In the context of the present disclosure, the expression 'incoming ingredient' refers to a newly identified ingredient. As shown in FIG. 3, point B shows when a list of incoming ingredients is constructed. In this case, point B indicates that the list of incoming ingredients, that are representative of each functionality from the list of functionalities Z obtained at point A, is constructed in context of the formulated product type Y. For example, if the formulated query is 'examples of whitening agent in cosmetics', the search excerpts obtained as result by the search engine is 'With regard to factors such as popularity, safety, and productiveness for cosmetic purposes, the most popular skin whitening agents are: hydroquinone, kojic acid, monobenzyl ether of hydroquinone, gentisic acid, azelaic acid, licorice, arbutin, retinoids, niacinamide, mequinol, soy, vitamin C, corticosteroids . . . '. As can be seen in the text obtained from the search engine, the text hydroquinone, kojic acid, monobenzyl ether of hydroquinone, gentisic acid, azelaic acid, licorice, arbutin, retinoids, niacinamide, mequinol, soy, vitamin C, corticosteroids shown as bold text and are referred as incoming ingredients that are representative of the functionality 'whitening agent' in context of the formulated product type cosmetics. In a similar way, the list of incoming ingredient can be obtained for a formulated query 'examples of UV filters in cosmetics' as shown in FIG. 4A.

Further, the list of functionalities for each incoming ingredient from the list of incoming ingredients in context of the specific formulated product type is obtained. The list of functionalities for each incoming ingredient in context of the specific formulated product type is obtained by processing the plurality of results retrieved from the one or more data sources based on a third set of queries. For example, if the identified incoming ingredients that are representative of the functionality 'whitening agent' in context of the formulated product type 'cosmetics' is 'hydroquinone' as shown in FIG. 4A and FIG. 4B, then the formulated query from the third set of queries could be 'What are the uses of 'hydroquinone' in cosmetics'. As shown in FIG. 4B, the search excerpts obtained as result by the search engine for the above formulated query is 'Hydroquinone is a skin-lightening agent. It bleaches the skin which is helpful in treating a different form of hyperpigmentation. Hydroquinone bleaches the skin and decreases the number of melanocytes present. Retinols are the best skincare products in the market'. As can be seen in the text obtained from the search engine, the text 'skin-lightening agent' is shown as bold text and is referred as a functionality of the incoming ingredient hydroquinone in context of the formulated product type cosmetics.

In an embodiment, the exhaustive list of incoming ingredients and functionalities indicates that no new incoming ingredient and functionality are identified. In other words, assuming that a lists of ingredients (represented as X) and their functionalities (Z) in the context of a formulated product type (Y) is required to be constructed, search starts with the known ingredient(s), by forming a query such as 'What are the uses of X in Y' as shown in FIG. 3. Further, the search excerpts returned by the search engine are processed to obtain the list of functionalities. For each functionality, another query 'what are other examples of Z in Y' is formulated, thereby getting search excerpts containing lists of ingredients. Once more ingredients are obtained than the ingredients at starting, the loop execution continues, as shown in FIG. 3, until the list of ingredients is exhausted. This means that there is no ingredient left for which new functionalities get added to the list of functionalities via querying and snippet processing. The search engine result excerpt loop ends at such a point.

In an embodiment, with the loop processing, it is no longer necessary to remain restricted to specific formats on specific sites as the search engines provide result excerpts from highly ranked sites including PDF and other text sources in their search index. Further, text processing needs to focus only on the search excerpts processing rather than handling a variety of formats and indirection present in structure of the specific sites. In the present disclosure, it is possible to nudge the search engine to imbibe a specific context. For instance, the query 'what are the uses of X in Y' instead of 'what are the uses of X' forces the search engine to look for and present the uses/application of X in the context of Y. While search engines may provide result excerpts for specific queries, the process of forming an appropriate query and processing the search excerpts to extract information of interest as a loop that runs until the exhaustion are automated in a principled manner rather than being conducted manually.

Figure 5:
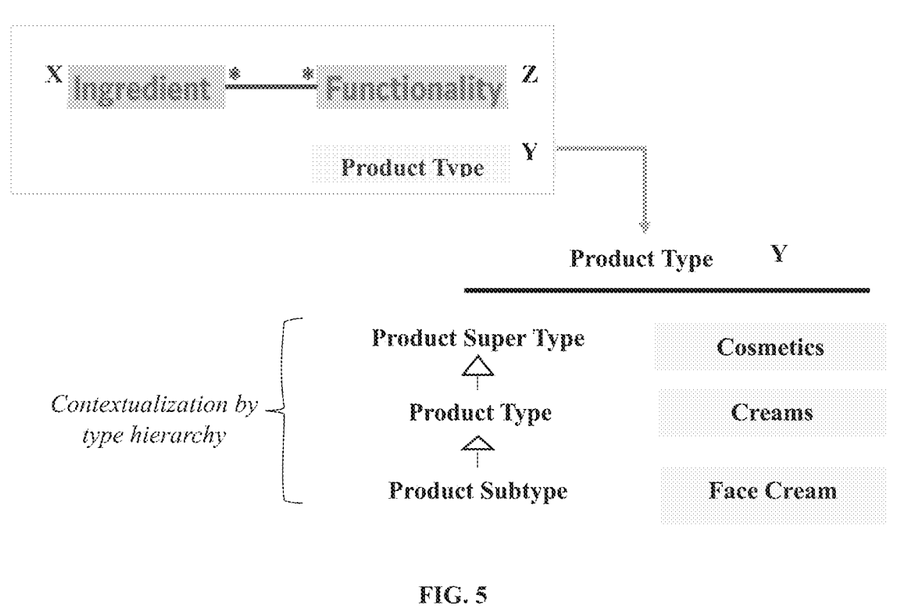
FIG. 5 depicts an example illustrating contextualization of search result excerpts by type hierarchy for automated construction of ingredient-functionality lists for formulated products using search engine result excerpts, using the system of FIG. 1, according to some embodiments of the present disclosure.

Further, with contextualization, it is possible to formulate a query such that the formulated product type Y is substituted with an increasingly specialized subtype in the query 'what are the uses of X in Y'. FIG. 5 depicts an example illustrating contextualization of search result excerpts by type hierarchy for automated construction of ingredient-functionality lists for formulated products using search engine result excerpts according to some embodiments of the present disclosure. This allows nudging the search engine to provide search results excerpts in the context of the subtype rather than type level, as shown in FIG. 5. In addition to context specialization, it is also possible to tweak the query for better results. For instance, in addition to 'what are the uses of X in Y', it is possible to form the query as 'what is X used as in Y' by taking a clue from the search excerpts that many of them contain the list of functionalities that start with the phrase X is 'used as' in Y. In addition, a query 'what is X used for in Y' can also be formulated. Also, a sizable proportion of search excerpts contain lists of functionalities with the phrase X is used for '*'ing in Y.

Experimental Results

In the present disclosure, results obtained for query formation, retrieval, extraction of functionalities as well as ingredients for type level context and subtype level context are described. Table 1 below provides a few examples of results obtained for the first set of queries formulated for the one or more input ingredients in context of the specific formulated product type to obtain the list of functionalities. In other words, Table 1 provides examples of query formulation and search results obtained using ingredients to obtain functionalities with formulated product type context.

TABLE 1

X: Ingredient(s), Y: Formulated Product Type(s), Z: Functionality(ies) of Ingredients

| Ingredients | Formulated Product Type | Functionalities in Excerpts |
| --- | --- | --- |
| Titanium dioxide | What is the use of titanium dioxide in cosmetics? | Titanium dioxide (TiO2) is widely used in a variety of products including cosmetics. TiO2 in its nanoparticle form (nano-TiO2) is now the only form used as an ultraviolet (UV) filter in sunscreens, but also in some day creams, foundations, and lip balms. |
| Retinol | What is the use of retinol in cosmetics? | Retinol increases skin cell production (proliferation). It helps unclog pores. Retinol also exfoliates your skin and increases collagen production, which can reduce the appearance of fine lines and wrinkles, giving your skin a fresher, plump appearance. |

TABLE 1-continued

X: Ingredient(s), Y: Formulated Product Type(s), Z: Functionality(ies) of Ingredients

| Ingredients | Formulated Product Type | Functionalities in Excerpts |
| --- | --- | --- |
| Cetyl alcohol | What is the use of cetyl alcohol in cosmetics? | Cetyl alcohol helps prevent creams from separating into oil and liquid. A chemical that helps to keep liquid and oil together is known as an emulsifier. It may also make a product thicker or increase the product's ability to foam. |

Table 2 below provides few examples of results obtained for the second set of queries formulated for the list of functionalities obtained for the one or more input ingredients in context of the specific formulated product type to obtain the list of incoming ingredients that are representative of each functionality from the list of functionalities. In other words, Table 2 provides examples of query formulation and search results obtained using functionalities to obtain incoming ingredients with formulated product type context.

TABLE 2

X: Ingredient(s), Y: Formulated Product Type(s), Z: Functionality(ies) of Ingredients

| Functionality | Formulated Product Type | Ingredients in Excerpts |
| --- | --- | --- |
| Ultraviolet (UV) filter | What are the examples of ultraviolet (UV) filter in cosmetics? | Common UV absorbers (also referred to as UV filters) include paraaminobenzoic acid and its derivatives, cinnamates, salicylates, camphor derivatives, avobenzone, triazones, and benzophenones. |
| Help unclog pores | What are the examples of ingredients that help unclog pores in cosmetics? | Salicylic acid is a popular chemical exfoliant that can help unclog pores. It is also useful for treating acne, hyperpigmentation, and other common skin conditions. |
| Emulsifier | What are the examples of emulsifier in cosmetics? | Types of emulsifiers commonly used in skin care products include sodium lauryl sulphate (SLS), benzalkonium chloride, behentrimonium methosulphate, cetearyl alcohol, stearic acid, glyceryl stearate and ceteareth-20. |

Table 3 below provides below provides few examples of results obtained for the first set of queries formulated for the one or more input ingredients in context of the specific formulated product sub-type to obtain the list of functionalities. In other words, Table 3 provides examples of query formulation and search results obtained using ingredients to obtain functionalities with formulated product sub-type context.

TABLE 3

X: Ingredient(s), Y: Formulated Product (sub)Type(s), Z: Functionality(ies) of Ingredients

| Ingredients | Formulated Product Type | Functionalities in Excerpts |
| --- | --- | --- |
| Titanium dioxide | What is the use of titanium dioxide in sunscreens? | In conclusion, titanium dioxide sunscreens are effective agents against UV radiation. They also have an advantage as they protect against multiple wavelengths of energy including UV radiation, visible light, and infrared radiation |

TABLE 3-continued

X: Ingredient(s), Y: Formulated Product (sub)Type(s),
Z: Functionality(ies) of Ingredients

| Ingredients | Formulated Product Type | Functionalities in Excerpts |
|---|---|---|
| Retinol | What is the use of retinol in acne cream? | Retinol works in a few ways. On the skin's outermost layer (epidermis), retinol exfoliates to remove dirt, dead skin cells, and oil from pores. This can help prevent pimples from forming. Unlike many other acne treatments, retinol also works by literally getting under your skin. |
| Cetyl alcohol | what is the use of cetyl alcohol in face creams? | This medication is used as a moisturizer to treat or prevent dry, rough, scaly, itchy skin and minor skin irritations (such as diaper rash, skin burns from radiation therapy). Emollients are substances that soften and moisturize the skin and decrease itching and flaking. |

In the present disclosure, it is observed based on the experimental results that more ingredients are obtained than functionalities per run of the loop, which is expected since in the formulated products domain, the number of functionalities is less compared to number of ingredients. Additionally, most loops end in few runs accumulating substantial number of ingredients and functionalities for the specific formulated product type or formulated product sub type.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein.

What is claimed is:

1. A processor implemented method, comprising:
receiving, via one or more hardware processors, one or more input ingredients and a specific formulated product type from a user;
formulating, via the one or more hardware processors, a first set of queries for the one or more input ingredients in context of the specific formulated product type;
processing, via the one or more hardware processors, a plurality of results retrieved from one or more data sources based on the first set of queries, wherein the one or more data sources include a plurality of search engines, and wherein the plurality of results retrieved from the one or more data sources include search excerpts and featured snippets;
obtaining, via the one or more hardware processors, a list of functionalities for one or more input ingredients in context of the specific formulated product type, wherein the list of functionalities is obtained by processing the search excerpts and the featured snippets of plurality of results retrieved from one or more data sources based on the first set of queries;

formulating, via the one or more hardware processors, a second set of queries for the list of functionalities obtained for the one or more input ingredients in context of the specific formulated product type; and iteratively performing, via the one or more hardware processors, until an exhaustive list of incoming ingredients and functionalities is constructed, the steps of:

constructing a list of incoming ingredients that are representative of each functionality from the list of functionalities obtained for the one or more input ingredients in context of the specific formulated product, wherein the list of incoming ingredients is obtained by processing the plurality of results retrieved from the one or more data sources based on the second set of queries, the list of incoming ingredients representing newly identified ingredients constructed in the context of the specific formulated product; and obtaining a list of functionalities for each incoming ingredient from the list of incoming ingredients in the context of the specific formulated product type, wherein the list of functionalities is obtained by processing the plurality of results retrieved from the one or more data sources based on a third set of queries, wherein the search excerpts from the plurality of search engines loop for automated construction of the list of incoming ingredients and the list of functionalities.

2. The processor implemented method of claim 1, wherein the plurality of results retrieved from the one or more data sources are processed using one or more natural language processing techniques.

3. The processor implemented method of claim 1, wherein the exhaustive list of incoming ingredients and functionalities indicates that no new incoming ingredient and functionality are identified.

4. A system, comprising:
a memory storing instructions;
one or more communication interfaces; and
one or more hardware processors coupled to the memory via the one or more communication interfaces, wherein the one or more hardware processors are configured by the instructions to:
receive one or more input ingredients and a specific formulated product type from a user;
formulate a first set of queries for the one or more input ingredients in context of the specific formulated product type;
process a plurality of results retrieved from one or more data sources based on the first set of queries, wherein the one or more data sources include a plurality of search engines, and wherein the plurality of results retrieved from the one or more data sources include search excerpts and featured snippets;
obtain a list of functionalities for one or more input ingredients in context of the specific formulated product type, wherein the list of functionalities is obtained by processing the search excerpts and the featured snippets of plurality of results retrieved from one or more data sources based on the first set of queries;

formulate a second set of queries for the list of functionalities obtained for the one or more input ingredients in context of the specific formulated product type; and iteratively perform, until an exhaustive list of incoming ingredients and functionalities is constructed:

constructing a list of incoming ingredients that are representative of each functionality from the list of functionalities obtained for the one or more input ingredients in the context of the specific formulated product, wherein the list of incoming ingredients is obtained by processing the plurality of results retrieved from the one or more data sources based on the second set of queries, the list of incoming ingredients representing newly identified ingredients constructed in the context of the specific formulated product; and obtaining a list of functionalities for each incoming ingredient from the list of incoming ingredients in context of the specific formulated product type, wherein the list of functionalities is obtained by processing the plurality of results retrieved from the one or more data sources based on a third set of queries, wherein the search excerpts from the plurality of search engines loop for automated construction of the list of incoming ingredients and the list of functionalities.

5. The system of claim 4, wherein the plurality of results retrieved from the one or more data sources are processed using one or more natural language processing techniques.

6. The system of claim 4, wherein the exhaustive list of incoming ingredients and functionalities indicates that no new incoming ingredient and functionality are identified.

7. One or more non-transitory machine-readable information storage mediums comprising one or more instructions which when executed by one or more hardware processors cause:

receiving one or more input ingredients and a specific formulated product type from a user;

formulating a first set of queries for the one or more input ingredients in context of the specific formulated product type;

processing a plurality of results retrieved from one or more data sources based on the first set of queries, wherein the one or more data sources include a plurality of search engines, and wherein the plurality of results retrieved from the one or more data sources include search excerpts and featured snippets;

obtaining a list of functionalities for one or more input ingredients in context of the specific formulated product type, wherein the list of functionalities is obtained by processing the search excerpts and the featured snippets of plurality of results retrieved from one or more data sources based on the first set of queries;

formulating a second set of queries for the list of functionalities obtained for the one or more input ingredients in context of the specific formulated product type; and iteratively performing, until an exhaustive list of incoming ingredients and functionalities is constructed, the steps of:

constructing a list of incoming ingredients that are representative of each functionality from the list of functionalities obtained for the one or more input ingredients in context of the specific formulated product, wherein the list of incoming ingredients is obtained by processing the plurality of results retrieved from the one or more data sources based on the second set of queries, the list of incoming ingredients representing newly identified ingredients constructed in the context of the specific formulated product; and obtaining a list of functionalities for each incoming ingredient from the list of incoming ingredients in the context of the specific formulated product type, wherein the list of functionalities is obtained by processing the plurality of results retrieved from the one or more data sources based on a third set of queries, wherein the search excerpts from the plurality of search engines loop for automated construction of the list of incoming ingredients and the list of functionalities.

8. The one or more non-transitory machine readable information storage mediums of claim 7, wherein the plurality of results retrieved from the one or more data sources are processed using one or more natural language processing techniques.

9. The one or more non-transitory machine readable information storage mediums of claim 7, wherein the exhaustive list of incoming ingredients and functionalities indicates that no new incoming ingredient and functionality are identified.

\* \* \* \* \*